(12) United States Patent
Scherbarth

(10) Patent No.: US 6,811,360 B1
(45) Date of Patent: Nov. 2, 2004

(54) BALL RACE MILLING CUTTER AND ASSOCIATED CUTTING PLATE

(75) Inventor: Stefan Scherbarth, Neuss (DE)

(73) Assignee: Sandvik AB, Sandviken (SE)

( * ) Notice: Subject to any disclaimer, the term of this patent is extended or adjusted under 35 U.S.C. 154(b) by 204 days.

(21) Appl. No.: 10/130,695

(22) PCT Filed: Nov. 22, 2000

(86) PCT No.: PCT/EP00/11621

§ 371 (c)(1),
(2), (4) Date: Aug. 26, 2002

(87) PCT Pub. No.: WO01/38029

PCT Pub. Date: May 31, 2001

(30) Foreign Application Priority Data

Nov. 25, 1999  (DE) .......................................... 199 56 592

(51) Int. Cl.⁷ .............................................. B23B 27/22
(52) U.S. Cl. ....................................... 407/113; 407/114
(58) Field of Search ................................ 407/113, 114, 407/61, 62, 42, 48; 408/188

(56) References Cited

U.S. PATENT DOCUMENTS

| 4,844,643 A | | 7/1989 | Icks | |
| 5,333,972 A | * | 8/1994 | Bernadic et al. | 407/113 |
| 5,951,213 A | * | 9/1999 | Fauser et al. | 407/35 |
| 6,102,630 A | * | 8/2000 | Flolo | 407/42 |
| 6,238,146 B1 | * | 5/2001 | Satran et al. | 407/113 |
| 6,244,791 B1 | | 6/2001 | Wiman et al. | |

FOREIGN PATENT DOCUMENTS

| WO | WO 95/00272 | 1/1995 |
| WO | WO 99/00207 | 1/1999 |

* cited by examiner

*Primary Examiner*—Willmon Fridie, Jr.
(74) *Attorney, Agent, or Firm*—Burns, Doane, Swecker & Mathis, L.L.P.

(57) ABSTRACT

An indexable cutting plate for ball race milling cutters includes upper and lower parallel surfaces, and an edge surface interconnecting the upper and lower surfaces. Cutting edges are defined by lines of intersection between the edge surface and the upper surface. The cutting edges include a main cutting edge extending radially with reference to an axis of rotation of the cutter, auxiliary cutting edge extending mainly axially, and an angle cutting edge defining a transition between the main and auxiliary cutting edges. The auxiliary cutting edge has a radius of curvature that is larger than that of the angle cutting edge and smaller than twice the diameter of the cutting head on which the cutting plate is mounted.

24 Claims, 2 Drawing Sheets

BALL RACE MILLING CUTTER AND ASSOCIATED CUTTING PLATE

BACKGROUND OF THE INVENTION

The present invention relates to a cutting plate for a ball race milling cutter and to an appropriate ball race milling cutter per se. In particular, such a cutting plate is provided with an upper and a lower surface that are substantially parallel to one another, wherein circumferential (continuous) edge surfaces connect the upper surface and the lower surface to one another, and wherein cutting edges are configured at least in part along the lines of intersection between the edge surfaces and the upper and/or lower surfaces. The feature that the upper and the lower surface are substantially parallel to one another clearly does not exclude deviation from parallel configuration or contouring with chip-guiding and chip-breaking structures.

The present invention also relates to a corresponding ball race milling cutter that is provided with a shank, a cutting head and a milling cutter axis, wherein at the forward free end of the cutting head there is provided at least one seat for an appropriate cutting plate.

Lastly, the present invention also relates to a method for manufacturing ball races with the aid of ball race milling cutters equipped with cutting plates, wherein active main and auxiliary cutting edges of the cutting plates are engaged respectively.

Corresponding ball race milling cutters and associated cutting plates have been known for a long time in the prior art, and are used in order to manufacture so-called ball races by cutting at a camber angle α, that is to say grooves with a round, but nevertheless generally not exactly circular cross-section. The groove cross-section is instead configured such that the radius of curvature at the base of the groove is smaller than the radius of the balls that will roll along this race. The depth of this groove is also generally less than the radius of the balls, wherein in cross-section, the lateral flanks of the groove have a radius of curvature that is somewhat greater than the radius of the balls rolling along it, so the balls rolling in the ball race substantially touch only the flank areas of the ball race and engage neither with the base of the groove nor with the upper edges of the groove. This makes possible a very exactly defined position for the balls at the same time as low rolling resistance, so by means of such ball races, different machine parts can be connected that have to move easily against one another, even when they are relatively heavy and/or large amounts of force have to be transmitted between these machine parts (and via the balls lying in between them). Ideally, the cross-section of the ball race is substantially elliptical with an eccentricity of 1.01 to 1.1, and a large semi-axis symmetrically dividing the ball race, wherein the small semi-axis is slightly larger than the radius of the balls that will roll in the race, and the eccentricity is matched to the radius of the balls such that the points of contact of the balls on the race, seen from the cross-section of the balls, lie approximately 70° to 90° apart, that is on the flanks of the ball race at approximately 35° to 45° from the base thereof.

FIG. 1 shows by way of an example a cross-section through a so-called pivot pin in the form of a more or less cylindrical bush on the internal surface of which there are several ball races axially or slightly inclined towards the axis, which in cross-section appear approximately the shape of a segment of a circle.

FIG. 2 shows in an enlarged detail view that the cross-section of the corresponding ball race is not circular, but instead elliptical, and is substantially characterised by a radius of curvature at the base of the ball race that is somewhat smaller than the radius of the balls, and by a radius of curvature in the flank area of the groove or respectively the ball race, that is larger than the radius of the balls. In the upper area, the groove width generally exceeds the ball diameter, at least the diameter of the ball at the height of the groove edges.

Corresponding ball races are, as already described, produced in the prior art with special ball race milling cutters that are arranged at a so-called camber angle α to the surface of the work piece, and in the end face area of which at least one specially formed cutting plate is located with which the desired groove shape is milled. The so-called camber angle is the angle between the milling cutter axis and the axis of the ball race or respectively the tangent on the axis in the section of the ball race that is currently being worked. Such a camber angle is typically in the range between 10° and 40°.

The cutting plates that are used in the end face area of the milling cutter generally have a shape that is approximately circular, sometimes slightly flattened in plan view, or more or less oval. They cut both with a main cutting edge arranged on the end face of the milling cutter, that has a directional component both in the axial direction as well as in a plane perpendicular to the milling cutter axis, and an auxiliary cutting edge that has a directional component more strongly parallel to the axis of the milling cutter. When using oval or respectively approximately circular cutting plates, the main and auxiliary cutting edges are obviously rounded and the transition from the main cutting edge to the auxiliary cutting edges is practically continuous without there being a clear differentiation between main and auxiliary cutting edges. Generally, however, this prior art can be characterised in that in the cutting edge section referred to as the "main cutting edge", the radial component of the cutting edge predominates, whereas the auxiliary cutting edge is defined by a stronger axial component.

The setting of the milling cutter axis in the camber angle, described hereinabove, with respect to the surface of the work piece is implemented in that the base of the groove is cut by a part or respectively a section of the cutting edge of the cutting plate that lies relatively far forward in the axial direction, and is at a shorter distance from the axis of the milling cutter than parts of the auxiliary cutting edge set further back axially. This means that the base of the groove is formed by a cutting edge section rotating on a smaller orbit, and thereby a smaller radius of curvature (if additionally dependent on the camber angle) than the flank sections of the groove or respectively the ball race that are cut by the auxiliary cutting edge areas that are further to the rear axially and further away radially from the axis of the milling cutter, that, because of the inclined adjustment of the milling cutter with respect to the surface of the work piece, cannot however reach the base of the groove.

The result is the at least approximately elliptical cross-sectional shape of the groove shown in principle in FIG. 2.

A disadvantage of the known cutting plates and ball race milling cutters is nevertheless in that for each ball diameter that necessitates a correspondingly dimensioned ball race, a cutting plate or respectively a cutting plate matched solely to the corresponding ball race has to be used with a milling cutter that has the appropriate diameter. As corresponding ball bearings or respectively ball joints are used and designed with widely differing diameters of balls, that are typically between 10 and 30 mm, a large number of different cutting plates have to be stocked in order to be able to correctly mill the proper ball race for every ball diameter. This means that the cutting plates for each individual ball diameter are used in comparatively small numbers, and nevertheless the manufacturer of such ball races must stock a large number of such cutting plates in order to be able to produce any desired dimension of ball race. In this way both the individual cutting plates and the manufacturing of such ball races are very expensive.

With respect to this prior art, the object of the present invention is to provide a cutting plate and a corresponding ball race milling cutter that make it possible to produce ball races for different ball diameters with one and the same type of cutting plate, also even with different milling cutter diameters.

Furthermore, the present invention should make it possible for a ball race to be created with several cutting edges that are located on different indexable cutting plates.

SUMMARY OF THE INVENTION

With respect to the cutting plate, this object is solved in that the cutting plate is provided with a main cutting edge substantially to be arranged on the end face, and an auxiliary cutting edge, with an angle cutting edge at the transition between the main and auxiliary cutting edges, which angle cutting edge, in plan view on the upper surface, is rounded with a comparatively small radius for the angle cutting edge, whereby in the same plan view, the auxiliary cutting edge also has a radius of curvature that is clearly larger than the radius of the angle cutting edge, and that is on the other hand smaller than twice the milling cutter diameter for which the cutting plate is provided.

The course of the main cutting edge is therefore not of paramount importance, in general the main cutting edge is substantially in a radial direction, that is to say mainly in a plane perpendicular to the axis of the milling cutter. The angle area, or respectively the angle cutting edge has a comparatively small radius and, in contrast to the angle cutting edge, the auxiliary cutting edge has an obvious axial component and is radially further outwards, but for its part is, however, curved, and is at least mainly slightly inclined towards the axis of the milling cutter. This results in the angle area, namely the angle cutting edge, being clearly offset radially inwards compared to the parts of the auxiliary cutting edge lying radially furthest out and further to the rear axially, and at the same time is arranged in the frontmost end face area of the milling cutter or respectively of the cutting plate. With appropriate adjustment of the axis of the milling cutter in the camber angle described hereinabove, this means that the base of the groove is cut by the angle area or respectively the angle cutting edge, while the flanks of the groove or respectively the ball race flanks, are cut by the auxiliary cutting edge offset further to the rear axially and radially further outwards. The curvature thereof ensures that the flank sections obtain the desired curvature that in addition is also dependent upon the milling cutter radius and the camber angle.

Using the indexable cutting plate according to the invention, it is possible to fit milling cutters in a larger range of diameters, for example, with a milling cutter diameter between 12 and 18 mm, with one and the same cutting plate in order to manufacture ball races for correspondingly different ball diameters in the same order of size of 12 to 18 mm. In order to cover the standard diameter range of 12 to, for example, 27 mm, only two different cutting plates are therefore necessary, the radii of curvature of which, on the angle cutting edges and the auxiliary cutting edges, are matched appropriately.

The manufacturing and stocking costs of the special cutting plates for ball race milling cutters can be significantly reduced in this way. Further, the shape of the cutting plate allows the easy attachment of a plurality of cutting inserts onto one tool, preferably of two or three cutting plates at the same or approximately the same angular distances apart. Intentionally provided small deviations from the same angular distances produce resonance-free and possibly quieter running of the tool.

Embodiments of the invention are preferred in which the angle area merges respectively tangentially into the corresponding auxiliary cutting edges and also into the main cutting edges.

An embodiment of the invention is particularly preferred in which the transition of the angle radius into the auxiliary cutting edge radius is at an angle of transition or respectively a connecting angle $\tau$ that is smaller than the camber angle $\alpha$, wherein the connecting angle $\tau$ is defined by the angle formed by the tangents on the cutting edge in this point of transition with the imaginary axis of the milling cutter in the pre-determined state of installation of the cutting plate. In this way it is ensured that the base of the groove is actually cut by the angle area with the smaller radius, while the auxiliary cutting edge, that for its part is round, cuts the flank areas.

A connecting angle is preferred in the range between 10° and 25°, while the camber angle $\alpha$ can be, for example, in the range of 12° to 45°. In general, the connecting angle $\tau$ is preferably between 2° and 12° less than the camber angle, wherein the small differential value is preferably taken into account with smaller camber angles.

The radius of the angle cutting edge is preferably between 0.2 and 5 mm, and in particular between 0.4 and 2.4 mm. On the other hand, the radius of the auxiliary cutting edge is clearly larger and in the preferred embodiment of the invention is between 5 and 30 mm, in particular between 8 and 25 mm, whereby this radius is nevertheless also dependent upon the diameter of the milling cutter. Advantageously, the radius of the auxiliary cutting edge is therefore determined dependent upon the milling cutter diameter for which the cutting plate is provided, and in this case, the auxiliary cutting edge radius should be between 0.7 times and 0.95 times the diameter of the milling cutter, which means, the other way around, that for a given cutting plate with a given auxiliary cutting edge radius, the diameter of the milling cutter can correspondingly vary in order to satisfy the criterion described hereinabove, wherein the slight exceeding or falling short of this relationship can easily be tolerated.

The cutting plates can have, for example, a rectangular or selectively also a triangular basic shape, as is known in the prior art, wherein the term "triangular" in this case also includes the so-called trigonal shape, while the term "rectangular" also covers rhombic plates. It is simply of importance that one of the triangular or rectangular sides can find application as an end face main cutting edge, and can be arranged such that the auxiliary cutting edge connects with the angle cutting edge at the connecting angle described, and also has the curvature described hereinabove.

The configuration of the cutting plate as an indexable cutting plate is particularly preferred, so that once a cutting edge becomes worn, another cutting edge can be put into use. In the case of rectangular indexable cutting plates, such a plate has on its upper side, preferably in the diagonally opposite corner areas, the transition between the main cutting edge and auxiliary cutting edge, so on the upper side two main cutting edges and two auxiliary cutting edges lie diagonally opposite one another with an angle cutting edge lying between them.

With such rectangular indexable cutting plates, nevertheless, the underside of the plate can also be provided with cutting edges, preferably in exactly the same way as on the upper side, but on the remaining diagonal corners.

The ball race milling cutter is characterised by an appropriate plate seat for the plates presently described. Preferably, the ball race milling cutter according to the invention is provided with a plurality of seats for appropriate plates, at the same or approximately the same angular distances apart along its front periphery section.

With respect to the method described in the introduction for manufacturing ball races, the object that forms the basis of the invention is solved by the use of one or more cutting plates, wherein main and auxiliary cutting edges are separated by an angle cutting edge, the radius of which is between 0.2 and 5 mm, preferably between 0.4 and 2.5 mm, while the radius of curvature of the main and auxiliary cutting edges respectively is at least five times this, preferably more than ten times the radius of curvature of the angle cutter.

In the preferred embodiment of the method according to the invention the main cutting edge is substantially straight, which corresponds to a very large or respectively infinitely large radius of curvature, and in the radial direction, while the radius of curvature of the auxiliary cutting edge is in the range between half and twice the milling cutter radius (maximum half-measurement of the ball race). Moreover, using the method according to the invention the cutting plates have all the features defined in the claims.

To the extent that in the description hereinabove and the claims there are described cutting edges or cutting edge sections curved in a radius, it is clear that these do not absolutely have to have a constant radius of curvature, but this radius can also vary in the course of the respective sections within the framework of the limits disclosed in the claims or can also be replaced with a polygon of sections shorter, straighter and angled with respect to one another, when in the centre, beyond the section concerned, average curvatures are produced that fall within the ranges claimed.

DETAILED DESCRIPTION OF A PREFERRED EMBODIMENT OF THE INVENTION

As has already been described hereinabove with reference to the prior art, ball races are necessary for guiding balls that, for their part, have to provide engagement in at least one direction in an interference fitting but frictionless manner between different parts that are moveable to a limited extent with respect to one another. The best known examples of this are obviously conventional ball bearings, but there are, moreover, many other machine elements that have to be connected together such that they are low in friction and moveable to a limited extent with respect to one another.

Figure 1:
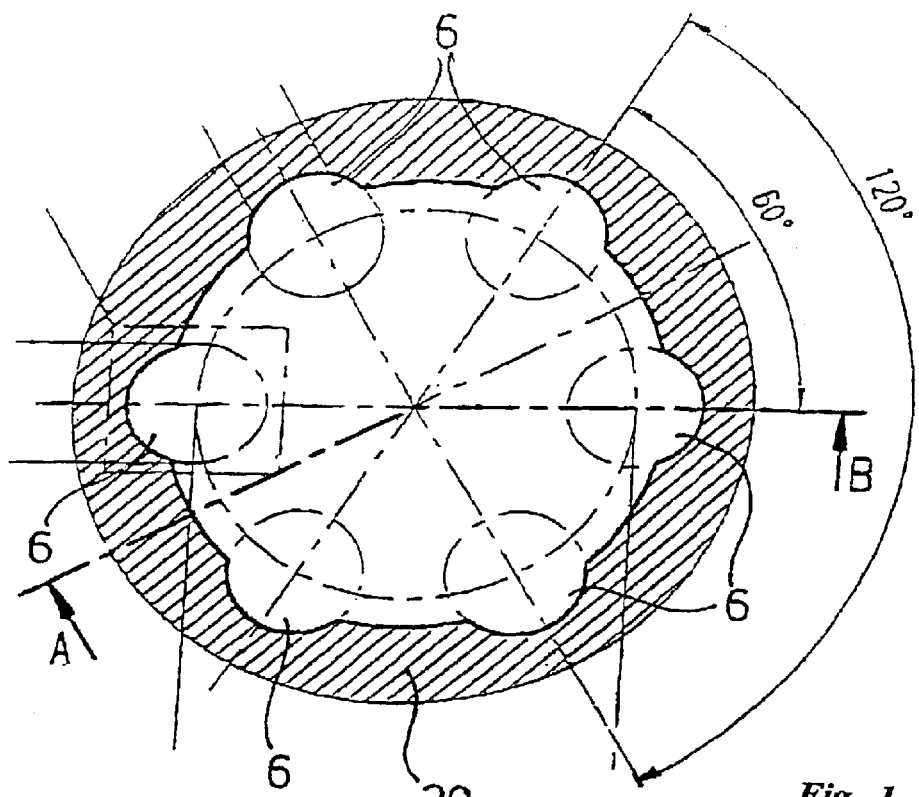
FIG. 1 a section through a prior art pivot pin with a total of six ball races that are recognizable substantially in cross-section, FIG. 2 a cross-section through a prior art ball race with a ball running therein shown in broken lines, FIG. 3 a ball milling cutter having a cutting plate according to the present invention, and FIG. 4 an enlarged view of an indexable cutting plate for a ball race milling cutter according to the according to the present invention.

FIG. 1 shows a pivot pin 20 in the form of a hollow cylinder, in the internal surface of which a total of six ball races in the form of grooves 6 are milled, that extend substantially axially with a slight inclination, that is not evident here, with respect to the axis of the pin 20.

Figure 2:
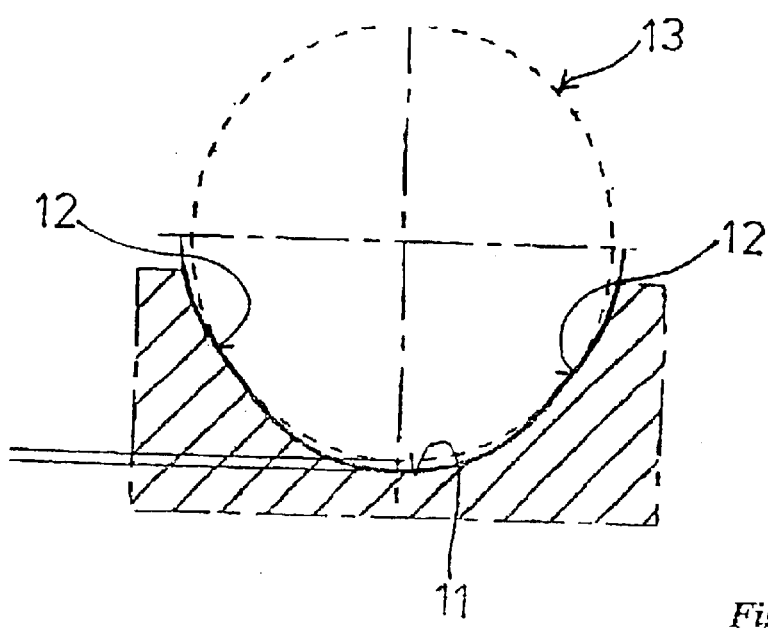

The cross-section of the ball race that substantially has the shape of a round groove 6, as is best seen in the enlargement according to FIG. 2, is not exactly the shape of a segment of a circle, but instead at the base of the groove 11 has a smaller radius of curvature than on the flanks 12 of the groove, wherein the groove also generally has a greater width in its upper edge area, that is to say is usually not undercut, although in principle, undercut groove flanks 12 would also be conceivable. As is evident in FIG. 2, the ball 13 shown in broken lines rolls in such a groove 6 on the flanks 12 of the groove, and does not touch the base 11 of the groove. In this way, however, the position of the ball 13 in the cross-sectional direction of the groove 6 is more exactly defined than would be the case if the ball actually rolled on the base of the groove. With a groove exactly matched to the diameter of the ball, with a circular cross-section, even if tolerances were exceeded to the slightest degree, considerable friction would occur. By means of the two opposite and spaced apart points of contact of the ball 13 in the area of the flanks 12 of the groove, greater forces can also be transmitted.

Figure 3:
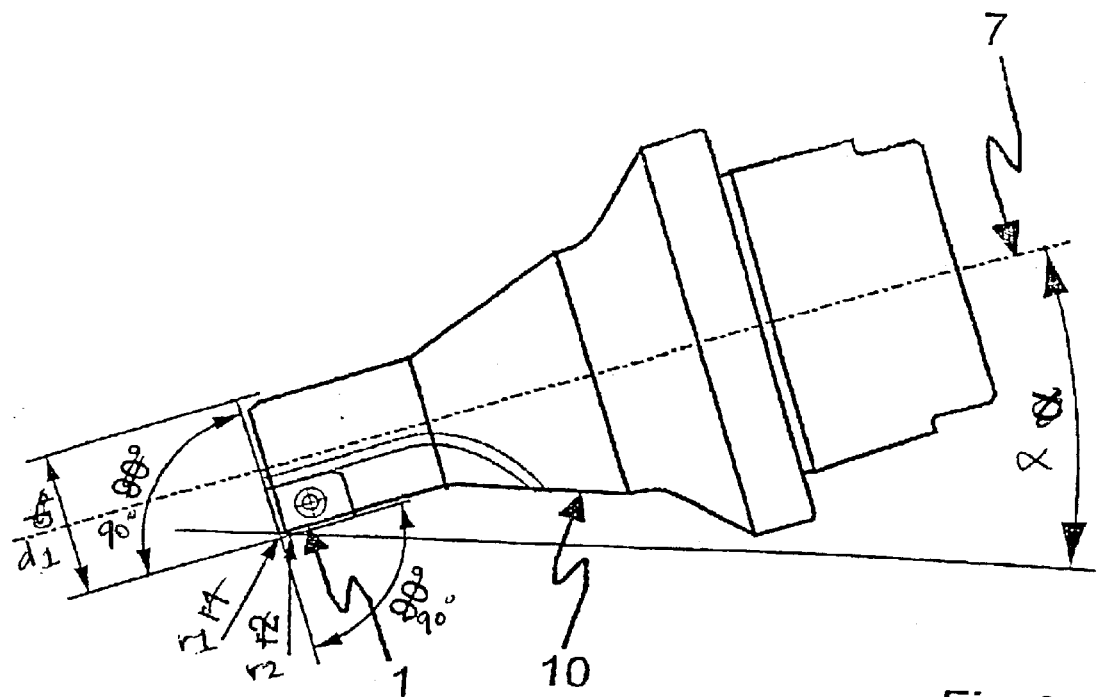
Figure 4:
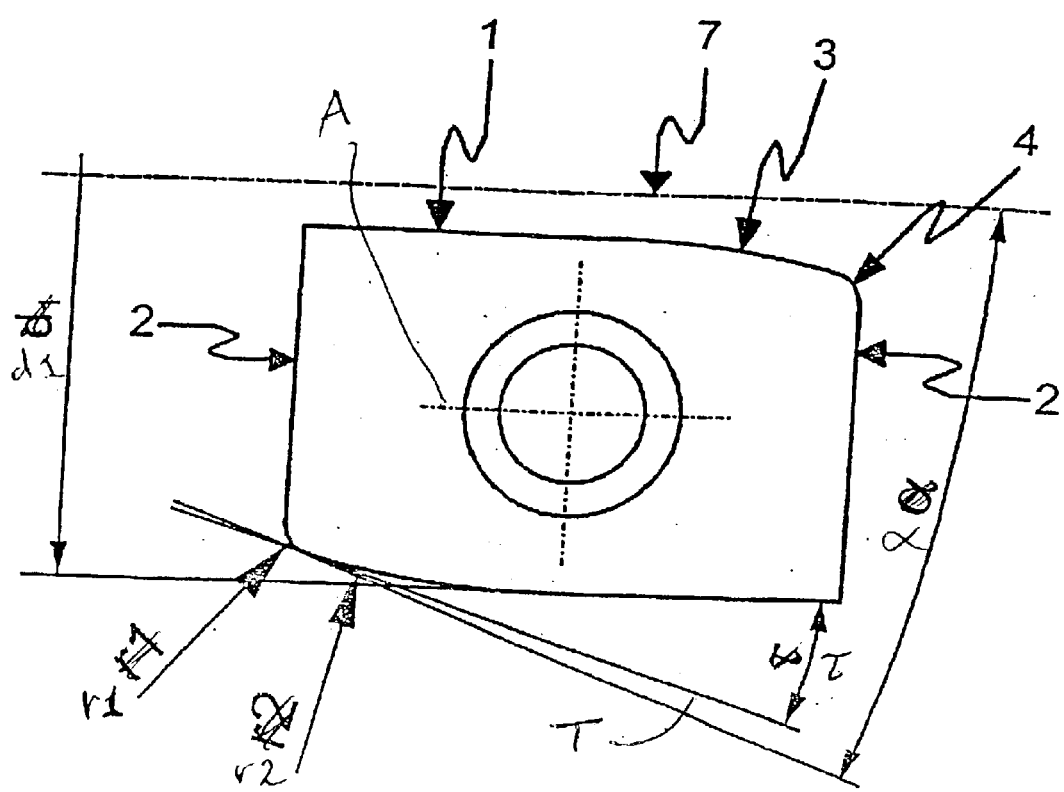

FIG. 3 shows a milling tool 10 according to the invention, wherein it does not depend upon the more exact configuration of the tool shank but instead in the first instance upon the fact that it is provided on its front cutting head with a plate seat for a cutting plate 1, as is shown in the preferred embodiment in FIG. 4. In FIG. 3 a work piece surface and respectively the direction of work of the milling cutter is shown by a horizontal line W, and the axis 7 of the milling cutter is set at an angle α with respect to this horizontal, which angle in this example is somewhat greater than 20°. The main cutting edge 2 of the indexable cutting plate 1 that is shown in the front end face of the milling cutter runs substantially in a radial plane and cuts the largest part of the material out of the work piece. The base of the groove or respectively the inner groove surface is cut by the angle cutting edge 4 and the auxiliary cutting edge 3 that can be seen more clearly in FIG. 4.

The camber angle α at which the cutting plate 1 normally operates is shown again in FIG. 4. As can be seen, the main cutting edge 2 merges via an angle cutting edge 4 with a relatively small radius 41 into the auxiliary cutting edge 3 that for its part has another radius of curvature r2 that is nevertheless clearly larger than the radius r1. Furthermore, in FIG. 4 the tangent τ at the transition point between the angle cutting edge 4 and auxiliary cutting edge 3 is indicated and the so-called connecting angle τ that is defined by the angle of this tangent τ to the axis 7 of the milling cutter (in this case to the straight rear extension of the auxiliary cutting edge 3, that, however, runs parallel to the milling cutter axis 7). It is evident that because of this connecting angle τ the base of the groove necessarily has to be cut by the part of the angle cutting edge 4 lying in front of this connecting area or transition point, whereas flank parts of the groove lying further up from the base are created by the cutting edge sections of the auxiliary cutting edge 3 arranged with a larger diameter.

Even when the radius of the milling tools is altered, that is to say moving the cutting plate 1 radially outwards or inwards relative to the axis 7 in FIG. 3, the image of FIG. 1 remains fundamentally the same, and the camber angle α can be varied within certain ranges so long as it remains larger than the connecting angle τ. This makes it possible to manufacture ball races with different diameters or respectively with different dimensions for corresponding different balls with one and the same type of cutting plate.

Clearly, the milling cutter shown in FIG. 3 preferably has a further cutting plate in a position offset by 180°, or also in several other positions, which are arranged at the same or approximately the same angular distances apart with respect to the cutting plate 1 shown, and relative to one another, which is particularly preferred when a high rate of production is sought, and which additionally contributes to substantially quieter running of the milling cutter.

What is claimed is:

1. A cutting plate for machining ball races, comprising upper and lower surfaces oriented substantially parallel to one another and edge surfaces interconnecting the upper and lower surfaces, a cutting edge structure defined at least in part by an intersection between the edge surfaces and the upper surface; the edge surfaces including long edge surface, and a short edge surface, the long edge surface extending substantially parallel to a longitudinal axis of the insert; the cutting edge structure including a main cutting edge, an auxiliary cutting edge, and an angle cutting edge; each main cutting edge defined by an intersection of the short edge surface and the upper surface; the auxiliary cutting edge defined by an intersection of the long edge surface and the upper surface and oriented at an angle relative to the main cutting edge; the angle cutting edge connecting the main cutting edge to the auxiliary cutting edge; the angle cutting edge, as viewed in a direction perpendicular to the upper surface, having a first radius, and the auxiliary cutting edge having a second radius larger than the first radius; wherein an angle of transition is formed at a transition point between the angle cutting edge and the auxiliary cutting edge, the angle of transition being formed between the longitudinal axis and a line tangent to the transition point and being in the range between 10° and 35°.

2. The cutting plate according to claim 1, wherein each of the auxiliary cutting edge and the main cutting edge join tangentially with respective ends of the rounded angle cutting edge.

3. The cutting plate according to claim 1 wherein the first radius is between 0.2 and 5 mm and the second radius is between 5 and 35 mm.

4. The cutting plate according to claim 1 wherein the first radius is between 0.4 and 2.4 mm, and the second radius is between 7 and 25 mm.

5. The cutting plate according to claim 1 wherein the cutting plate is configured as an indexable cutting plate with at least two main cutting edges and two auxiliary cutting edges.

6. The cutting plate according to claim 5, wherein the cutting plate is of generally rectangular shape.

7. The cutting plate according to claim 6 wherein the main and auxiliary cutting edges are formed at a corner of the upper surface of the cutting plate, and corresponding main and auxiliary cutting edges are formed at a diagonally opposite corner of the upper surface, whereby the cutting plate is indexable.

8. The cutting plate according to claim 7 wherein corresponding main and auxiliary cutting edges are also formed at each of two diagonally opposite corners of the lower side, whereby the cutting plate is reversible.

9. A ball race milling cutter comprising:
a shank defining an axis of rotation and including a cutting head; and
a cutting plate mounted on the cutting head and including upper and lower surfaces oriented substantially parallel to one another and edge surfaces interconnecting the upper and lower surfaces; a cutting edge structure defined at least in part by an intersection between the edge surfaces and the upper surface; the cutting edge structure including a main cutting edge, an auxiliary cutting edge, and an angle cutting edge; the main cutting edge disposed in a radial plane oriented perpendicularly to the axis of rotation: the auxiliary cutting edge oriented at an angle relative to the main cutting edge; the angle cutting edge connecting the main cutting edge to the auxiliary cutting edge; the angle cutting edge, as viewed in a direction perpendicular to the upper surface, having a first radius, and the auxiliary cutting edge having a second radius larger than the first radius: wherein an angle of transition is formed at a transition point between the angle cutting edge and the auxiliary cutting edge, the angle of transition being formed between the axis of rotation and a line tangent to the transition point and being in the range between 10° and 35°.

10. The ball race milling cutter according to claim 9 wherein each of the auxiliary cutting edge and the main cutting edge join tangentially with respective ends of the rounded angle cutting edge.

11. The ball race milling cutter according to claim 9 wherein the first radius is between 0.2 and 5 mm and the second radius is between 5 and 35 mm.

12. The ball race milling cutter according to claim 9 wherein the first radius is between 0.4 and 2.4 mm, and the second radius is between 7 and 25 mm.

13. The ball race milling cutter according to claim 9 wherein the cutting head defines a diameter where the cutting plate is mounted, the second radius being between 0.7 and 0.95 times that diameter.

14. The ball race milling cutter according to claim 9 wherein the cutting plate is configured as an indexable cutting plate with at least two main cutting edges and two auxiliary cutting edges.

15. The ball race milling cutter cutting according to claim 9 wherein the cutting plate is of generally rectangular shape.

16. The ball race milling cutter according to claim 9 wherein the main and auxiliary cutting edges are formed at a corner of the upper surface of the cutting plate, and corresponding main and auxiliary cutting edges are formed at a diagonally opposite corner of the upper surface, whereby the cutting plate is indexable.

17. The ball race milling cutter according to claim 16 wherein corresponding main and auxiliary cutting edges are also formed at each of two diagonally opposite corners of the lower side, whereby the cutting plate is reversible.

18. The ball race milling cutter according to claim 9 wherein the cutting plate constitutes a first cutting plate, the cutter further including at least one additional cutting plate mounted on the cutting head and being identical to the first cutting head.

19. A method of manufacturing ball races comprising engaging a surface of a workpiece with a cutting plate mounted on a rotating shank of a ball race milling cutter; the cutting plate having a cutting edge structure comprising a main cutting edge, an auxiliary cutting edge, and an angle cutting edge connecting the main cutting edge to the auxiliary cutting edge; the angle cutting edge having a radius being between 0.2 and 5.0 mm; the radius of each of the main cutting edge and the auxiliary cutting edge being at least five times as large as the radius of the angle cutting edge; wherein the milling cutter is oriented such that the main cutting edge, the auxiliary cutting edge an angle cutting edge all engage the surface of the workpiece as the shank rotates.

20. The method according to claim 19 wherein the radius is between 0.4 and 2.5 mm.

21. The method according to claim 19 wherein the radius of each of the main cutting edge and the auxiliary cutting edge is more than ten times the radius of the angle cutting edge.

22. The method according to claim 21 wherein the main cutting edge is substantially straight and extends in a substantially radial direction with reference to an axis of rotation of the shank, the radius of the auxiliary cutting edge being in a range of between one-half and twice a radius of a cutting head of the shank.

23. The method according to claim 19 wherein an axis of rotation of the milling cutter forms an angle of camber with the surface of the workpiece in a range between 12° and 45°.

24. The method according to claim 19 wherein the cutting plate comprises upper and lower surfaces oriented substantially parallel to one another and edge surfaces interconnecting the upper and lower surfaces, a cutting edge structure being defined at least in part by an intersection between the edge surfaces and the upper surface; the cutting edge structure including a main cutting edge, an auxiliary cutting edge, and an angle cutting edge; the main cutting edge disposed in a radial plane oriented perpendicularly to the axis of rotation; the auxiliary cutting edge oriented at an angle relative to the main cutting edge; the angle cutting edge connecting the main cutting edge to the auxiliary cutting edge; the angle cutting edge, as viewed in a direction perpendicular to the upper surface, having a first radius, and the auxiliary cutting edge having a second radius larger than the first radius; wherein an angle of transition is formed at a transition point between the angle cutting edge and the auxiliary cutting edge, the angle of transition being formed between the axis of rotation and a line tangent to the transition point and being in the range between 10° and 35°; wherein the milling cutter is rotated about the axis of rotation which forms an angle of camber in a range between 12° and 45° with the surface of the workpiece.

* * * * *